(12) United States Patent
Kim

(10) Patent No.: US 8,405,526 B2
(45) Date of Patent: Mar. 26, 2013

(54) APPARATUS FOR INPUTTING A CHARACTER

(76) Inventor: Dong Joo Kim, Seoul (KR)

( * ) Notice: Subject to any disclaimer, the term of this patent is extended or adjusted under 35 U.S.C. 154(b) by 541 days.

(21) Appl. No.: 12/602,898

(22) PCT Filed: May 30, 2008

(86) PCT No.: PCT/KR2008/003051
§ 371 (c)(1), (2), (4) Date: Apr. 6, 2010

(87) PCT Pub. No.: WO2008/150084
PCT Pub. Date: Dec. 11, 2008

(65) Prior Publication Data
US 2010/0201547 A1 Aug. 12, 2010

(30) Foreign Application Priority Data

| Jun. 4, 2007 | (KR) | 10-2007-0054196 |
| Jun. 5, 2007 | (KR) | 10-2007-0054788 |
| Jun. 15, 2007 | (KR) | 10-2007-0058636 |
| May 19, 2008 | (KR) | 10-2008-0046307 |

(51) Int. Cl.
*H03M 11/00* (2006.01)
(52) U.S. Cl. .......................................... 341/22; 341/23
(58) Field of Classification Search ................... 341/22, 341/23, 20, 28, 34; 345/169, 156, 168; 455/564
See application file for complete search history.

(56) References Cited

U.S. PATENT DOCUMENTS

| 6,541,715 B2 * | 4/2003 | Swanson ........................ 200/5 A |
| 2005/0168447 A1 * | 8/2005 | Caine et al. .................... 345/169 |

* cited by examiner

*Primary Examiner* — Joseph Lauture

(57) ABSTRACT

Provided is an apparatus for inputting a character which enables users to input characters more conveniently by arranging input keys having 3 or 4 input interfaces appropriately in a keypad. If the present invention is applied to small sized electronic equipment such as a mobile phone and PDA, much more various types of characters can be arranged as compared with the space the input keys take, and thereby it becomes possible to input characters faster with the minimum amount of effort.

12 Claims, 18 Drawing Sheets

⟨Separated Type⟩

⟨Integrated Type⟩

⟨Separated Type⟩

⟨Integrated Type⟩

⟨Diagonal(X)⟩

⟨Crisscross⟩

⟨Diagonal(X)⟩

⟨Crisscross⟩

<Crisscross>    <Diagonal(X)>

⟨Modified H Format⟩

⟨Modified T Format⟩

APPARATUS FOR INPUTTING A CHARACTER

TECHNICAL FIELD

The present invention relates to an apparatus for inputting a character which arranges an input key having 3 or 4 input interfaces appropriately in a keypad, and thereby facilitates inputting a character.

BACKGROUND ART

The typical three methods to input characters of electronic equipment having a function of inputting a character are a standard input apparatus of a telephone, a keyboard input apparatus of a computer and touch screen input apparatus.

First, the standard input apparatus of a telephone is for transmission of characters using number pads of a telephone. It was designed for a specific character to be recognized according to how many times a specific number is pressed. This method was useful when a data converter is not included in a telephone, however at present this method is not any more efficient since a mobile phone became a little computer converting inputted data into standard data and sending them.

Also, this method is used when pressing number pads with an index finger, holing a mobile phone with another hand, whereas pressing number pads using a thumb or thumbs of both hands, holding a mobile phone with one hand is come into general use these days. When arranging a lot of characters by using twelve (3 by 4) key input apparatus which is standards substrate of a telephone, one same key pad is pressed several times unavoidably. It is after all, cause a problem that mull more keys are need to be pressed than when inputting a same character by using computer.

Especially, as the functions of a mobile phone are improving, people search phone numbers in the telephone directory in storage and frequency of inputting characters is increasing since different characters are input according to the situations, whereas telephone in the past was focused on inputting numbers than inputting characters.

On the other hand, touch screen inputting method which is used in PDA is a method to input characters by torching keyboards or character pads panels in a screen with a thin bar. This method also has a problem that the inputting speed is very slow since the characters are input with one hand.

After all, the fastest inputting method among the above three typical inputting methods is a keyboard inputting method. However, the problem of this method is that the keyboard is too bulky. One of good examples of this is an electronic dictionary. Too many keyboards in a too small space only brought an inconvenience.

Accordingly, a new convenient inputting method suited to portable small sized electronic equipments having more character input keys and using a space more efficiently which enables people to input characters with one hand or two thumbs of both hands has been required.

A new method is proposed to solve the problems aforementioned.

'A keypad of an informational terminal (Registered Utility Model No. 20-340166)' is a method allotting 3 to 4 different characters in 3 to 4 different directions of one button (input key). That is to say, a button having 3 directions has a shape of 'T' and the number of arranged buttons is 12 same as a standard substrate of a telephone.

DISCLOSURE OF INVENTION

Technical Problem

The problem of the above Utility Model is that there is a strong probability of typing error since the directions of the right and left keys of the T shaped button are horizontal and the right and left keys are placed together so that when pushing the right or left key the keys are easily pushed together.

Also, 12 arranged buttons in a keypad makes the keypad bulky.

An objective of the present invention is 1) to solve the problems of the traditional T shaped button and 2) to provide optimum input key allotting 3 or 4 characters in one button and 3) to arrange several input keys having 3 or 4 input interfaces in a keypad with the smallest space and 4) to enable people to input characters with one hand or two thumbs of both hands conveniently.

Technical Solution

As a technical solution to achieve the objectives aforementioned, according to a first aspect of the present invention, there is provided an apparatus for inputting a character having several input keys in a keypad to input characters wherein the input keys have 3 input interfaces outputting different key signal and certain characters are allotted in each input interface so that 3 different characters can be input with one input key and, wherein the input key is Y or inverse Y shaped that 3 directions of input interfaces are one integrated type or separated type.

According to the traditional T shaped input key having 3 input interfaces, a strong probability of typing error was the problem since the keys are easily pushed together, however this problem can be overcome by changing the shape of input keys to the Y or V shaped as the present invention applies.

According to a second aspect of the present invention, there is provided an apparatus for inputting a character having several input keys in a keypad to input characters wherein the input keys have 3 input interfaces outputting different key signal and certain characters are allotted in each input interface so that three different characters can be input with one input key and, wherein the input keys having 3 input interfaces are placed 3 by 3, a total of 9, in the above keypad.

The total number of input keys placed in a keypad is 9 which is the smallest for one typing per one character so that the space for input keys is reduced and also the inconvenience when inputting characters is dissolved.

According to a third aspect of the present invention, there is provided an apparatus for inputting a character having several input keys in a keypad to input characters wherein the above input keys have 4 input interfaces outputting different key signal and certain characters are allotted in each input interface so that 4 different characters can be input with one input key and, wherein the above input keys is integrated type or each input interface is separated type and wherein 7 input keys are placed in a H or T format in the above key pad.

There is provided the most convenient structure for user that The total number of input keys placed in a keypad is 7 which is the smallest for one typing per one character the input keys having 4 input interfaces.

Advantageous Effects

According to the present invention, inputting characters with portable small sized electronic equipments like a mobile phone become much faster than inputting characters with standards substrate of a traditional telephone by allotting 3 to 4 characters in one button which enables people to input characters with one hand or two thumbs of both hands.

In addition, according to the present invention, the purpose of one typing per one character can be accomplished in not only Korean and English but also Japanese and Chinese which input the pronunciation of the native languages in English in a keyboard.

MODE FOR THE INVENTION

Hereinafter, an exemplary embodiment of the present invention will be described with reference to the accompanying drawings. However various modifications could be made to the described embodiments and the scope of the invention is not defined by the described embodiments. An exemplary embodiment of the present invention is provided for a clear explanation to those of ordinary skill in the art.

Figure 1:
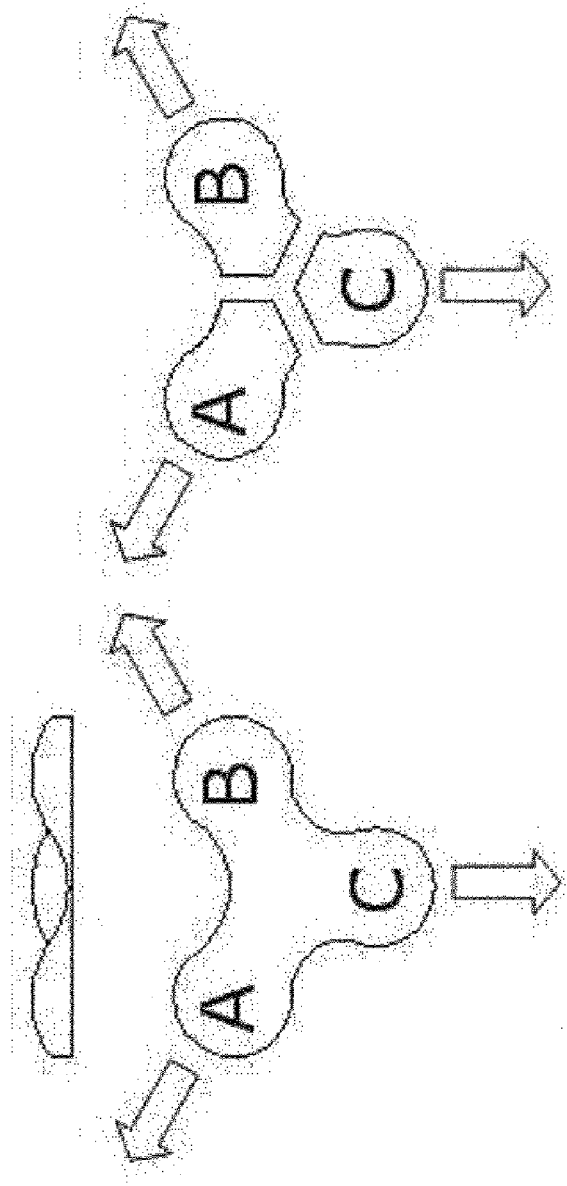
FIG. 1~FIG. 2 illustrate an apparatus for inputting a character having 3 input interfaces in an input key according to an exemplary embodiment of the present invention.
Figure 2:
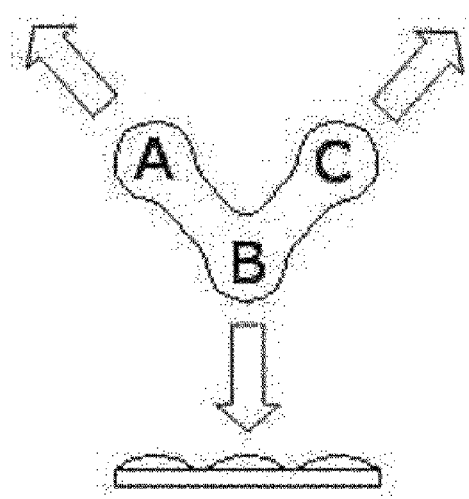

FIG. 1~FIG. 2 illustrate an apparatus for inputting a character having 3 input interfaces in an input key according to an exemplary embodiment of the present invention.

Referring to FIG. 1, an apparatus for inputting character according to an exemplary embodiment of the present invention is illustrated in Y shaped. An input key includes 3 input interfaces. According to the position of the input interfaces pressed in the input key, one key signal among the 3 input interfaces is output.

A Y shaped input key can be produced as integrated type or separated type. Integrated type consists of one input key (see the left one of FIG. 1). Separated type looks like integrated type in general, but it is separated according to the position of the input interfaces (see the right one of FIG. 1).

In case of a button (input key) having 3 input interfaces, by making a direction of right and left key of the T shaped button upward or downward on the horizon, a probability of typing error occurred in a T shaped button can be reduced since the direction is changed. When this form is applied, the shape of an input key is Y or inverse Y.

Also, in order to reduce a probability of typing error, it is desirable to concave the middle of a Y shaped button and convex the position of the input interfaces with 3 directions so that a thumb is placed comfortably and different characters are input according to the direction of input. The upper drawing of the Y shaped integrated type input key in the left of FIG. 1 is a cross sectional view of an input key looking down from the upper side to the lower side.

Referring to FIG. 2, an apparatus for inputting character according to an exemplary embodiment of the present invention is illustrated V shaped. A V shaped input key is a button form that takes the upper right and left end points and the middle lower corner of the V shape as an input interfaces. This method reduces a probability of typing error because the directions of the right and left keys are upward by regular angle. Furthermore, this button form is convenient for English users to solve the problem of confusion of keyboard layout when using T shaped and Y shaped input keys.

Specifically, when using English characters, a traditional standard substrate of a telephone allots ABC in number 2, DEF in number 3 and GHI in number 4. If these characters are arranged in T shaped and Y shaped input keys, characters are allotted in order of the left (A), the right (B) and the lower part (C) as shown in FIG. 1. This arrangement could bring confusion of finding a position of a certain character, even though the arrangement is same as the order that people habitually use. However, a V shaped input key allot A in the left, B in the middle of the lower part and C in the right as illustrated in FIG. 2 so that the shape of the arrangement gets similar to the shape of ABC arranged horizontally which reduces English users' confusion.

Also, a V shaped input key has an advantage that a probability of typing errors could be reduced by making a position of input interfaces where characters are allotted bulged. The lower drawing of the V shaped integrated type input key in the left of FIG. 2 is a cross sectional view of an input key looking down from the upper side to the lower side.

Of course, the Y shaped input key could arrange A in the left, B in the middle of the lower part and C in the right as the V shaped input key does, however this is optional because this method has a difference in the order writing characters.

Furthermore, it is useful to arrange input keys same as arrangement of input keys in a telephone standard number substrate to reduce users' confusion. However an input key having 3 input interfaces has to be bigger than a traditional input key having one inputting interface. Therefore, to apply this to a mobile phone it is desirable to make a keypad as small as possible and apply the smallest number which doesn't have any inconvenience for input to 3 interfaces and keep the rest as the form of a traditional button having one interface.

To accomplish this, the total number of the keys that one typing per one character is possible should be calculated first. In case of Korean, a total of 24 keys including consonants and vowels are required and in case of English, a total of 26 keys are required. After all, an input key having 3 input interfaces is the most reasonable arrangement method since it is possible for an input key having 3 input interfaces to input 27 keys if only apply a total of 9 keys arranged 3 by 3, and thereby an input key having 3 input interfaces could tackle both of Korean and English.

Figure 3:
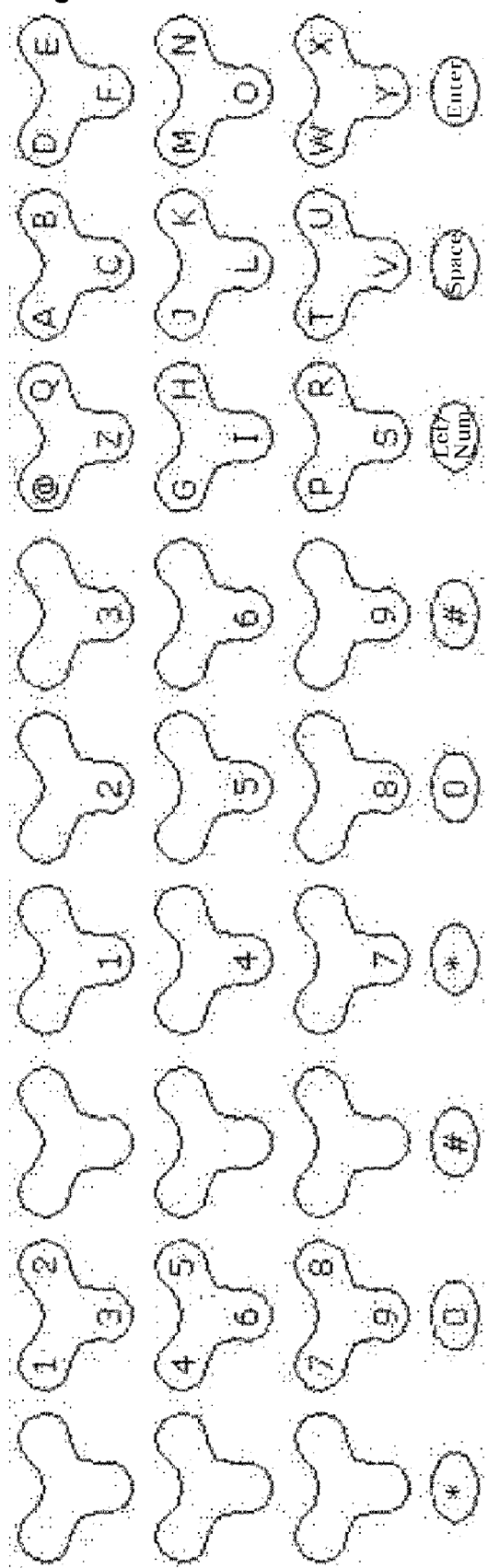
FIG. 3~FIG. 5 are exemplary embodiments of the present invention applying Y shaped input key to a real keypad as 3 by 3, a total of 9.
Figure 4:
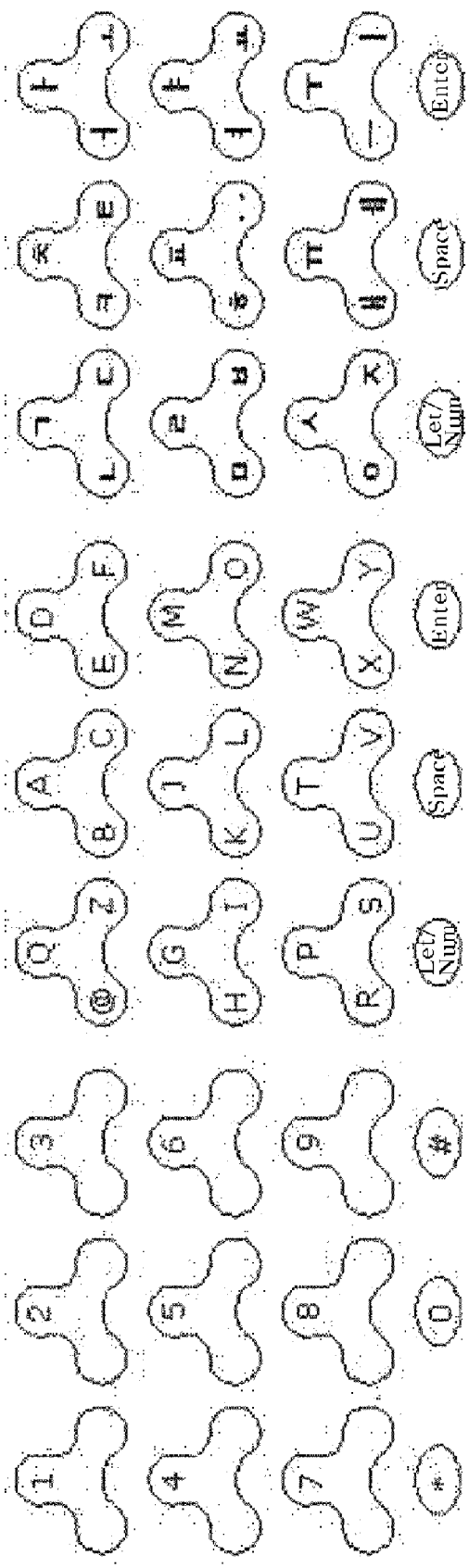
Figure 5:
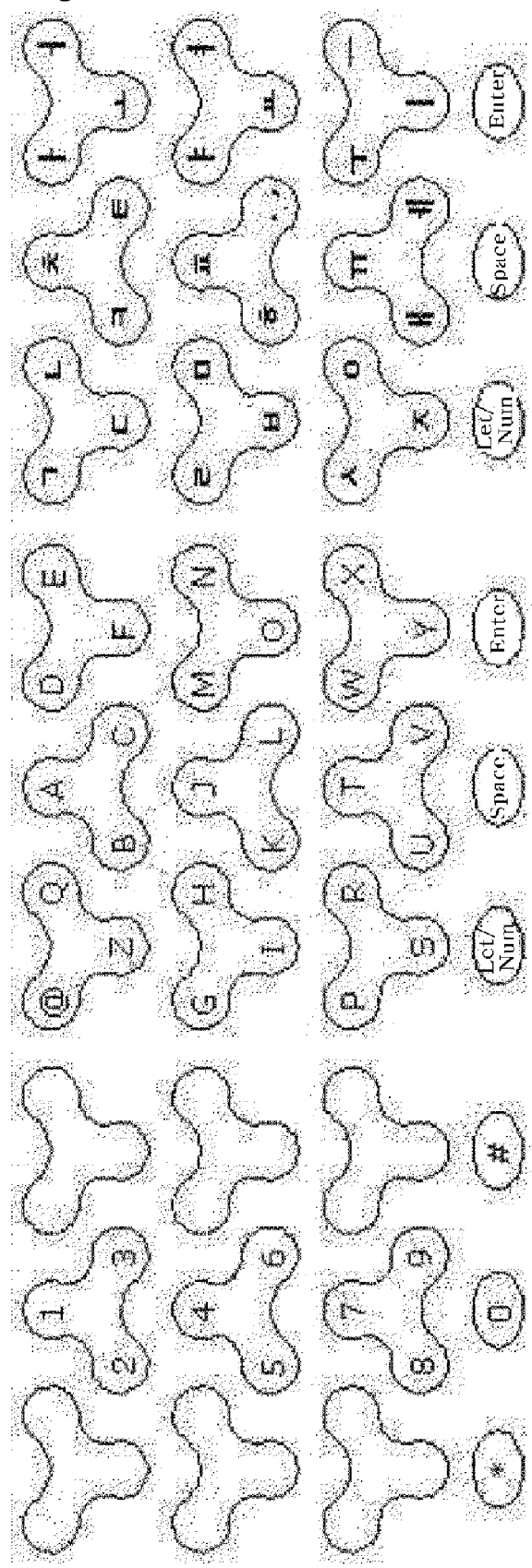

FIG. 3~FIG. 5 are exemplary embodiments of the present invention applying Y shaped input key to a real keypad as 3 by 3, a total of 9.

FIG. 3 is an arrangement of a total 9 inverse Y shaped keypads, FIG. 4 is an arrangement of a total 9 Y shaped keypads and FIG. 5 is an arrangement of mix of inverse Y shaped and Y shaped keypads.

Referring to FIG. 5, Y shaped keypads are arranged in the right and left lines and inverse Y shaped keypads are in the middle lines so that the right and left keys are not overlapped each other thereby not only typing errors but also the width between the right and left of the keypads are reduced.

Figure 6:
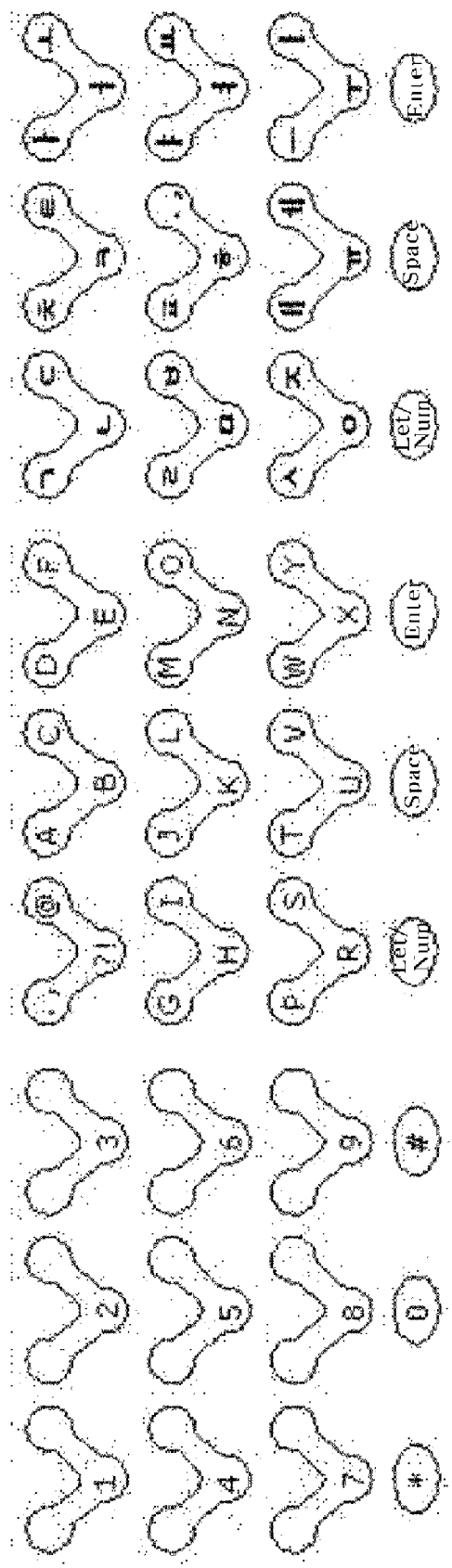
FIG. 6~FIG. 8 are exemplary embodiments of the present invention applying V shaped input key to a real keypad as 3 by 3, a total of 9.
Figure 7:
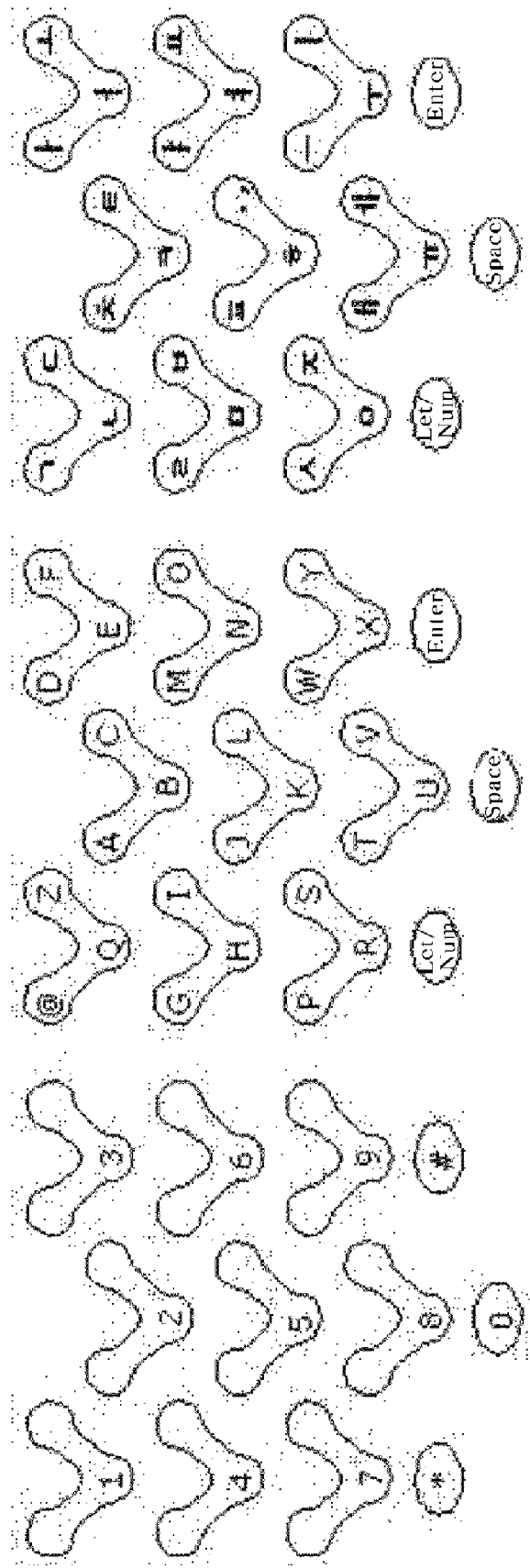
Figure 8:
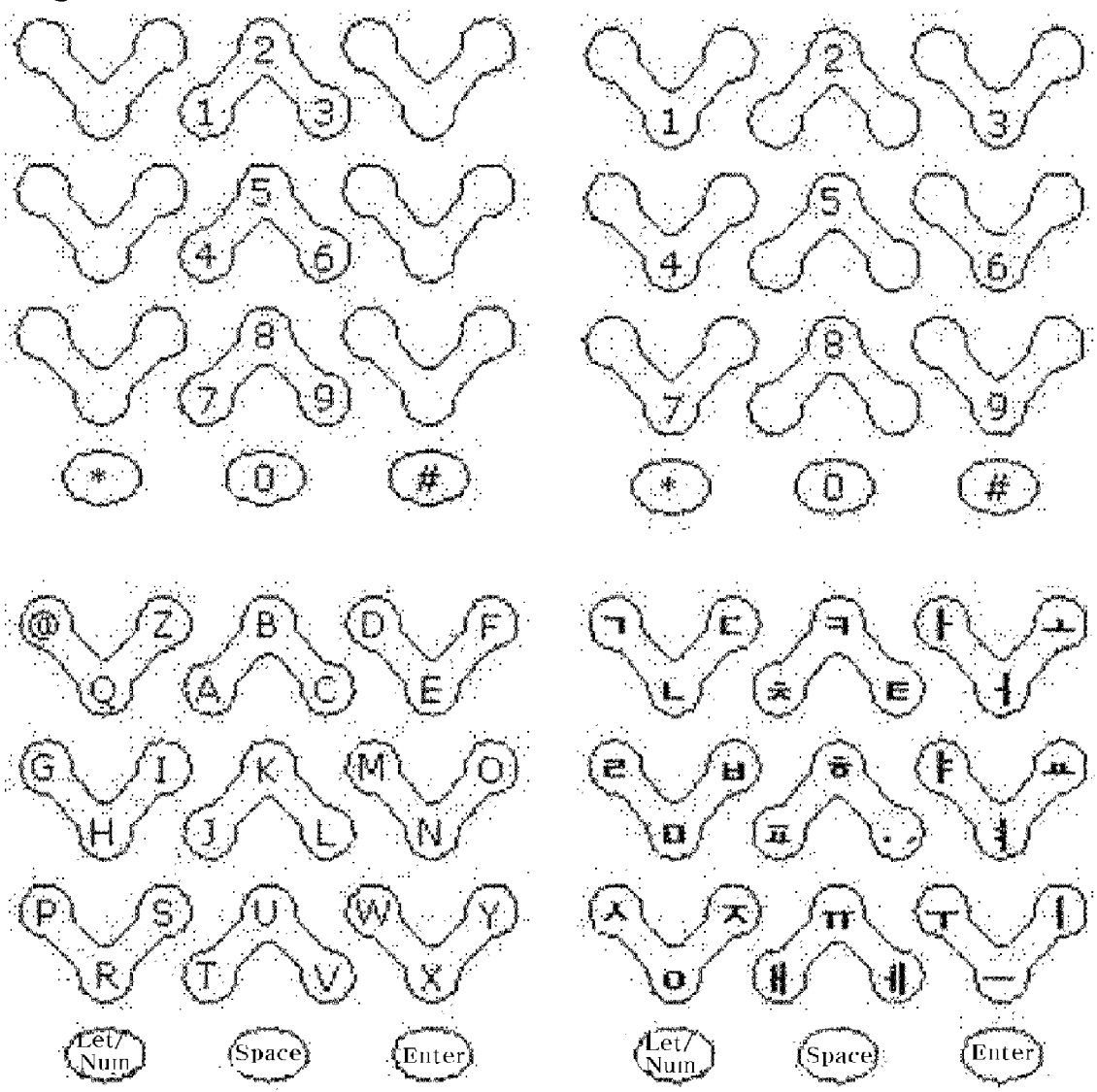

FIG. 6~FIG. 8 are exemplary embodiments of the present invention applying 3 by 3, a total of 9 of V shaped input keys to a real keypad. FIG. 6 is an arrangement of a total 9 inverse V shaped keypads, FIG. 7 is an arrangement of V shaped keypads lowered the middle lines than the right and left lines and FIG. 8 is an arrangement of V shaped keypads in the right and left lines and inverse V shaped keypads in the middle line.

Figure 9:
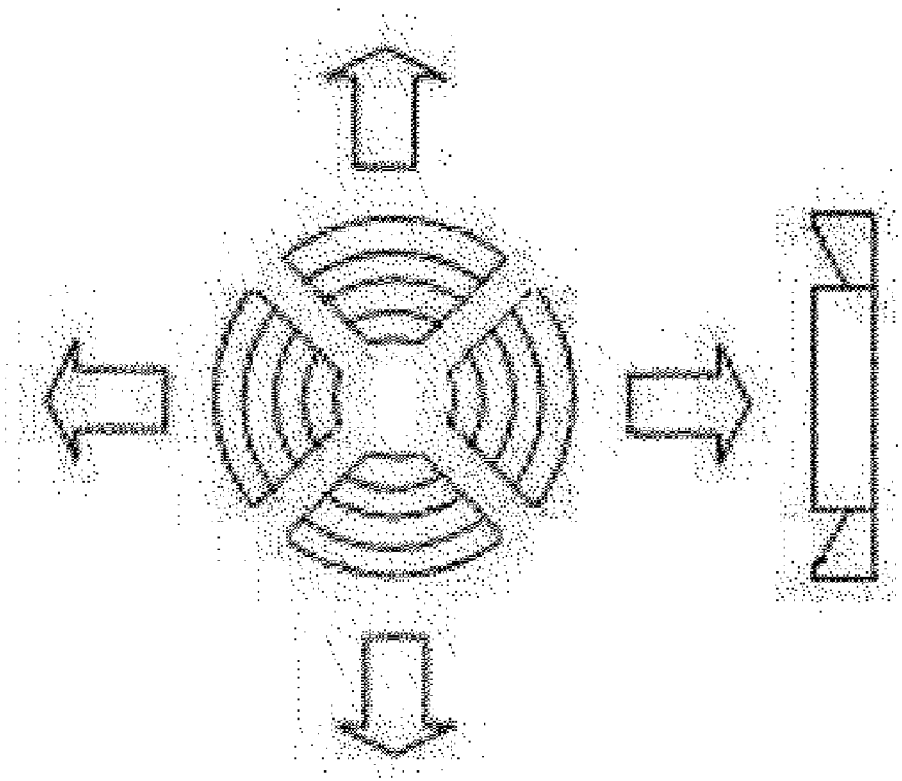
FIG. 9~FIG. 10 illustrate a apparatus for inputting a character having 4 input interfaces in an input key according to an exemplary embodiment of the present invention.
Figure 9:
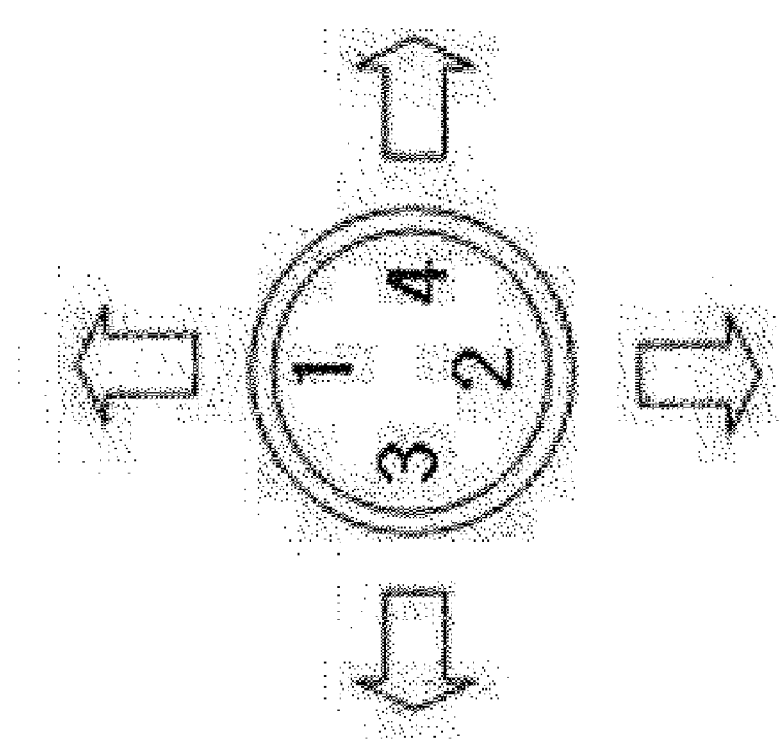
Figure 10:
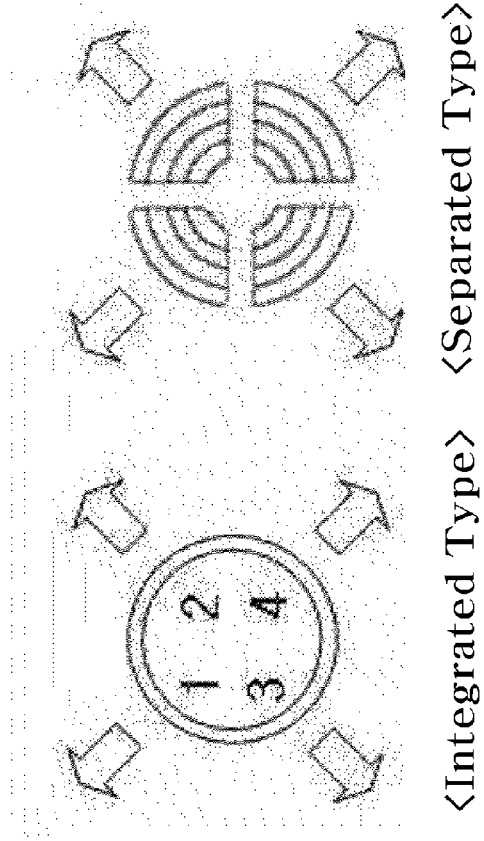

FIG. 9~FIG. 10 illustrate an apparatus for inputting a character having 4 input interfaces in an input key according to an exemplary embodiment of the present invention.

Referring to FIG. 9~FIG. 10, an input key according to an exemplary embodiment of the present invention has 4 input interfaces (1, 2, 3 and 4) and the input interfaces are arranged in crisscross shape in the directions of top and bottom, right and left. This kind of input keys are divided into integrated type and separated type. An arrangement in crisscross shape can also used as a direction key for game.

The 4 input interfaces of the present invention can also be arranged in X shaped in the directions of diagonal. In this case as well, the input keys are divided into integrated type and separated type, only one difference is a position of the input interfaces. The arrangement of X shape has an advantage that recognition of the arranged characters is easier than the arrangement of a crisscross shape because the input interfaces are allotted 2 by 2 in the X shape and this makes allotted characters in the form of 2 by 2, horizontal writing.

The arrangement method for characters allotted in input interfaces of each input key can be modified in various ways depend on the circumstances such as methods of left right top and bottom, clockwise, counter clockwise, vertical writing besides aforementioned methods.

As illustrated in FIG. 9 and FIG. 10 the method of the buttons (input keys) having 4 input interfaces has one more input key than the method of the buttons (input keys) having 3 input interfaces so that the number of the buttons can be reduced. In this case, there isn't any problem to take both Korean and English characters because it is possible to input 28 characters, if a total of 7 keys are arranged.

Figure 11:
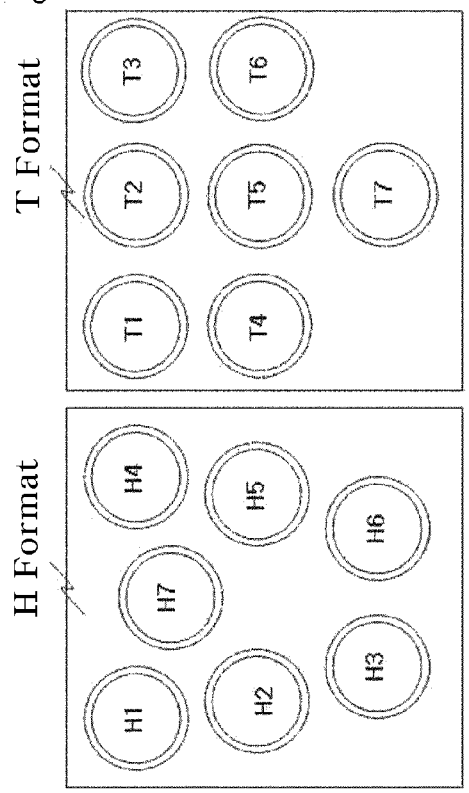
FIG. 11 is an exemplary embodiment of the present invention regarding a basic method of arrangement for H and T shaped input key having 4 interfaces.

FIG. 11 is a drawing arranging an apparatus for inputting a character in the H format and T format using input key having 4 interfaces according to an exemplary embodiment of the present invention.

Referring to FIG. 11, in the H format, it is easy to use the right and left keypads separately in a horizontal writing method like a method of inputting Korean characters and an electronic dictionary. On the other hand, the T format is useful in English using areas because it takes a horizontal writing method having lots of similarities with traditional telephone standard substrates.

In the H format, 3 input keys are arranged in the right line and left line each and more than one input key can be additionally arranged between the two lines selectively. Also an input key with one or two directions can be additionally arranged for special functions such as inputting blank or enter function.

Also, in the H format, the intervals between input keys is closed toward the bottom lines therefore the input keys can be arranged as a V format (or U format) in an overall view.

This is designed for the input keys to be closed each other toward the bottom because when inputting characters with a thumb of a right hand, it is harder to input '#' key than inputting '3' key based on the traditional telephone standard substrate.

Furthermore, the H format is designed to be convenient for inputting numbers using left 3 lines with a thumb of right hand and using right 3 lines with a thumb of left hand.

In the T format, 3 input keys are arranged in the first line and second line each and more than one input key can be additionally arranged in the bottom of the keys selectively. Also an input key with one or two directions can be additionally arranged for special functions such as inputting blank or enter function.

In addition, the T format is useful in English using areas because it is horizontal writing having lots of similarities with the traditional telephone standard substrate. The input key arranged in center of the bottom is arranged there for convenient use of a thumb.

Furthermore, in the T format, it is easy to press the number keys in the middle or the left with a thumb of right hand and contrary to this with a thumb of left hand.

When inputting Korean characters, if consonants are arranged in the left side and vowels are in the right side in both H and T formats, it is easy for users to find characters and to input characters using right thumb over left thumb.

FIG. 12~FIG. 17 are examples of an apparatus for inputting a character applying the H format arrangement method and FIG. 18~FIG. 21 are examples of an apparatus for inputting a character applying a T format arrangement method according to an exemplary embodiment of the present invention.

Figure 12:
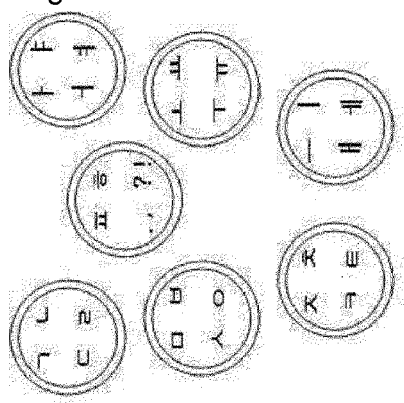
FIG. 12~FIG. 17 are examples of an apparatus for inputting a character applying the H format arrangement method and FIG. 18~FIG. 21 are examples of an apparatus for inputting a character applying a T format arrangement method according to an exemplary embodiment of the present invention.
Figure 12:
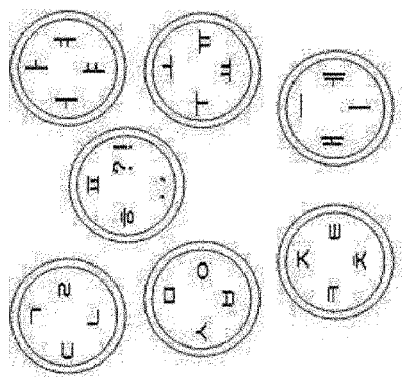

Referring to FIG. 12, When 7 input keys arranged in the H format are allotting consonants and vowels of Korean characters in each input key, consonants are allotted in the left side and vowels are in the right side in order to be convenient for input using thumbs of both hands, thereby the same effect of inputting characters with a keyboard of a computer could be obtained. The 'Shift' key for inputting ㅒ and ㅖ among the double consonant and diphthong is omitted because inputting the same key twice seems more efficient than using the 'Shift' key when input ㅒ and ㅖ. However, depend on the circumstances the 'Shift' key or any other additional keys can be added.

The advantages of the arrangement method for Korean characters according to the present invention could be learned from the result of the test performed against every product that to input the character 'mobile phone' the traditional input method for Korean characters of a mobile phone requires users to input keys total 11~14 times whereas the method according to the present invention requires users to input keys only total 7 times thereby inputting time is reduced almost to the half.

Figure 13:
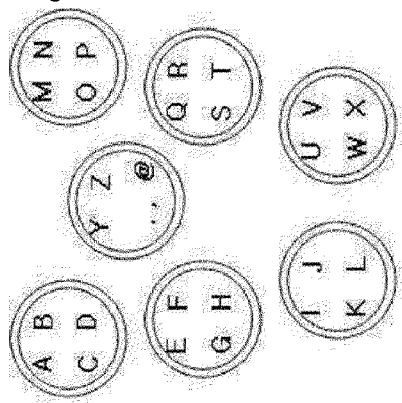
Figure 13:
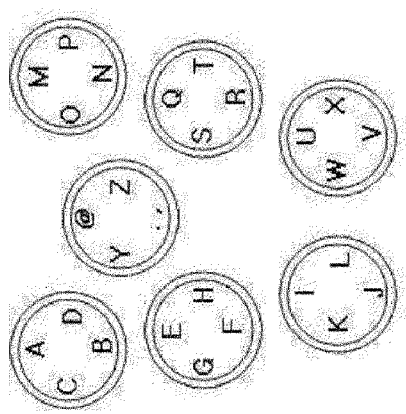

Referring to FIG. 13, When 7 input keys arranged in the H format are allotting alphabet in each input key, characters are allotted in 3 buttons each of the right and left side and the rest of characters are allotted in the middle, thereby through only one input, all characters can be input using thumbs of both hands. In result, this speeds up the input speed.

Figure 14:
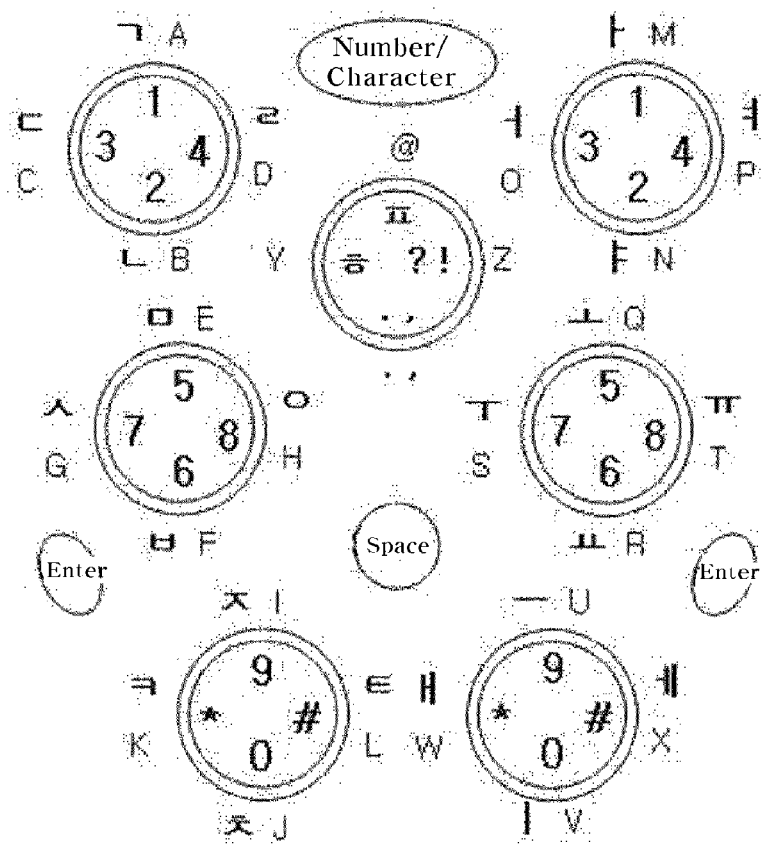

Referring to FIG. 14, When 7 input keys arranged in a H format are allotting both Korean and English characters in each input key, as explained above, 3 input keys are arranged in each of the right line and left line of a keypad and the input keys for the rest of characters are arranged in the middle.

Figure 15:
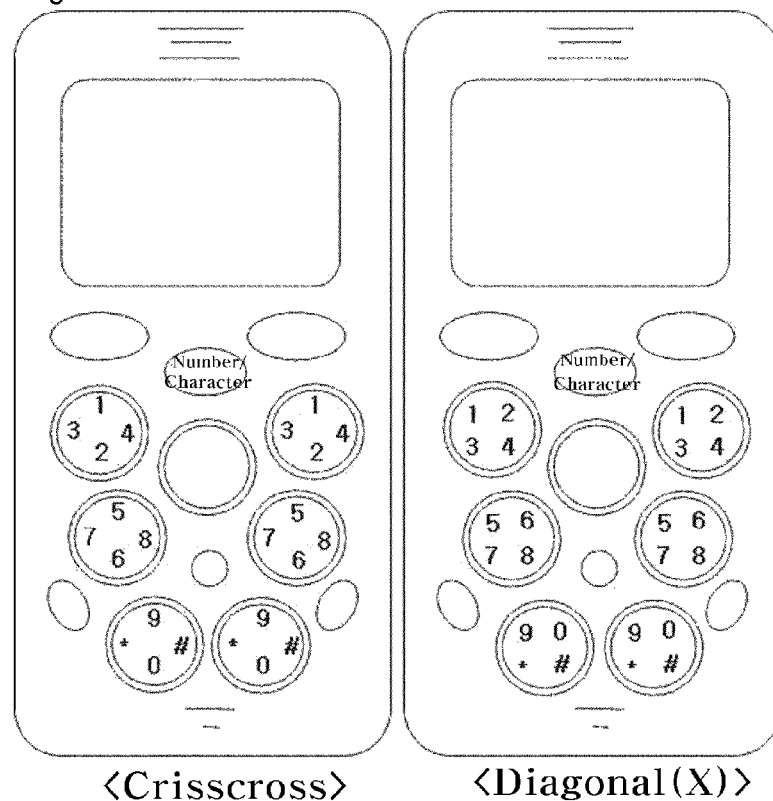
Figure 16:
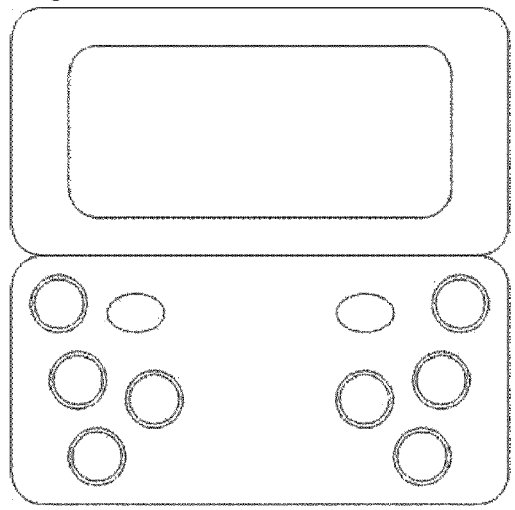

FIG. 15 and FIG. 16 are drawings to explain exemplary embodiments of the present invention that arranged input keys in a H format are applied in a keypad of electronic equipments.

Referring to FIG. 15, input keys can be arranged in a H format in a keypad of a mobile phone, 10 numbers and characters (* and #) can be allotted in only 3 input keys so that when push buttons using a mobile phone, if the user use a thumb of right hand, push the buttons in left side conveniently according to structure of a hand and if the user use a thumb of left hand, contrary to this and if the user use both thumbs of both hands, allot 1, 2, 3, 4 keys in a thumb of one hand and 5, 6, 7, 8 in a thumb of another hand. In result, the input speed is improved to be faster.

Referring to FIG. 16, input keys can be allotted in small sized equipments such as an electronic dictionary and a horizontal type mobile phone. It is designed based on a H format to be able to use the right and left keys separately for a convenience when inputting characters holding a small sized electronic equipment in both hands.

Also, a 'Space' key is in the middle and an 'Enter' key is in the right and left side. This is to make it possible to input characters with a thumb of one hand minimizing movement of fingers.

Figure 17:
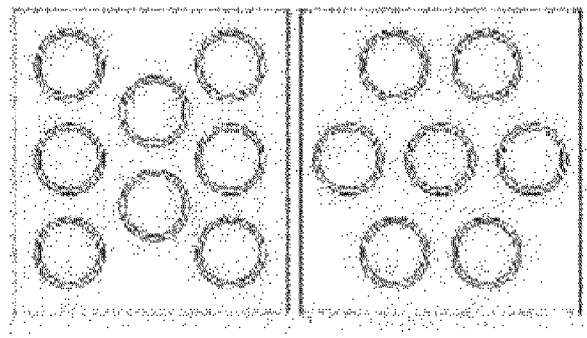
Figure 17:
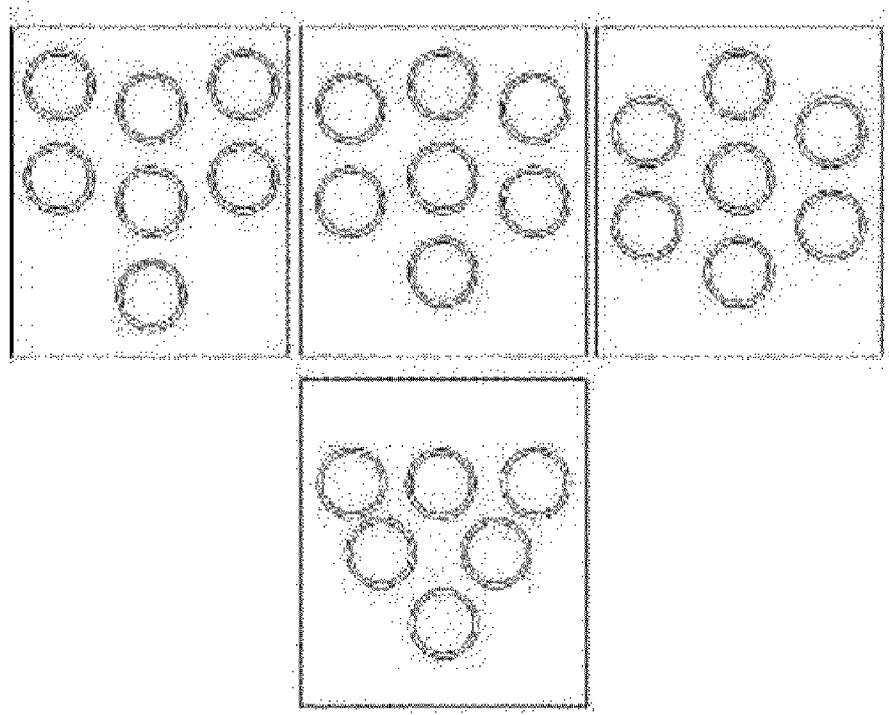

Referring to FIG. 17, there are provided various exemplary modifications that the intervals between input keys in the bottom line or in the top portion can be arranged wider or narrower than the intervals between input keys in the middle line when input keys are arranged in the H or T formats.

FIG. 18~FIG. 21 are to explain exemplary embodiments of the present invention that Korean, English and numbers are allotted each when input keys are arranged in a T format.

Figure 18:
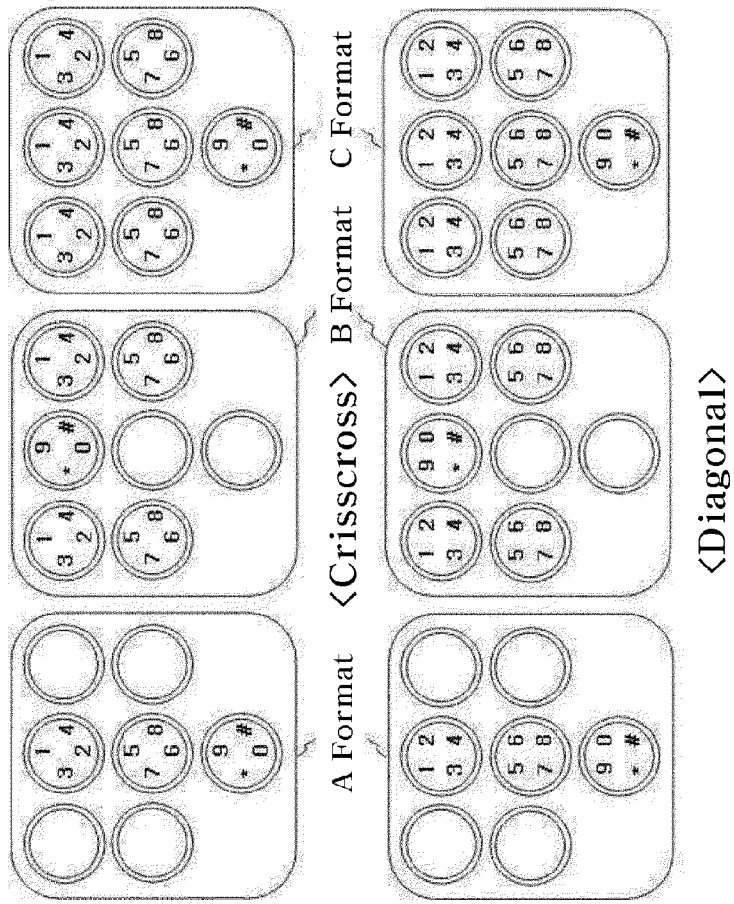

Referring to FIG. 18, 3 input keys are arranged in the first and second row each, 3 input keys are arranged in second line in the middle, after all 7 input keys are arranged in the T format in a key pad. Type A arranges numbers and characters in the 3 middle buttons for a convenient use with both hands. Type B allots numbers from 1 to 8 in each of 2 keys placed in the first and third line so that when use the thumb of the right hand, users can conveniently use the left side buttons and when use the thumb of the left hand, users can conveniently use the right side buttons. Also, the rest of numbers and characters are arranged in one of the buttons in the second line in the middle for a convenient use with the thumbs of both hands. Type C arranges numbers in all buttons so users can use the buttons according to their convenience.

Figure 19:
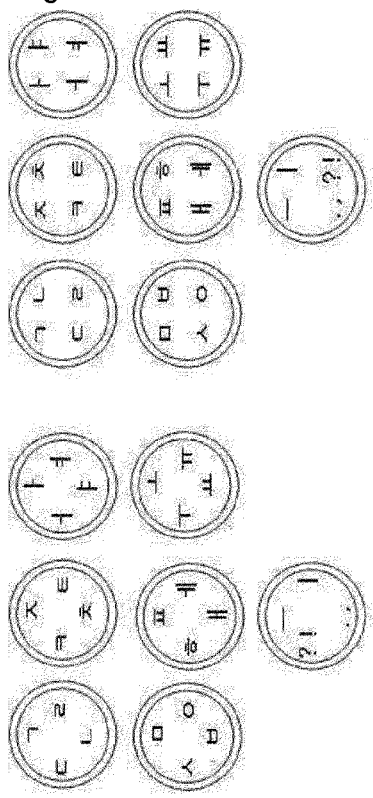

Referring to FIG. 19, when Korean characters are arranged in the input keys in a T format, consonants are allotted in the input keys in the first line (left side), vowels are allotted in the input keys in the third line (right side) and the rest of characters are allotted in the second line (middle) in order to avoid fingers crossed each other. The above arrangement of consonants and vowels can be modified depend on the circumstances.

Figure 20:
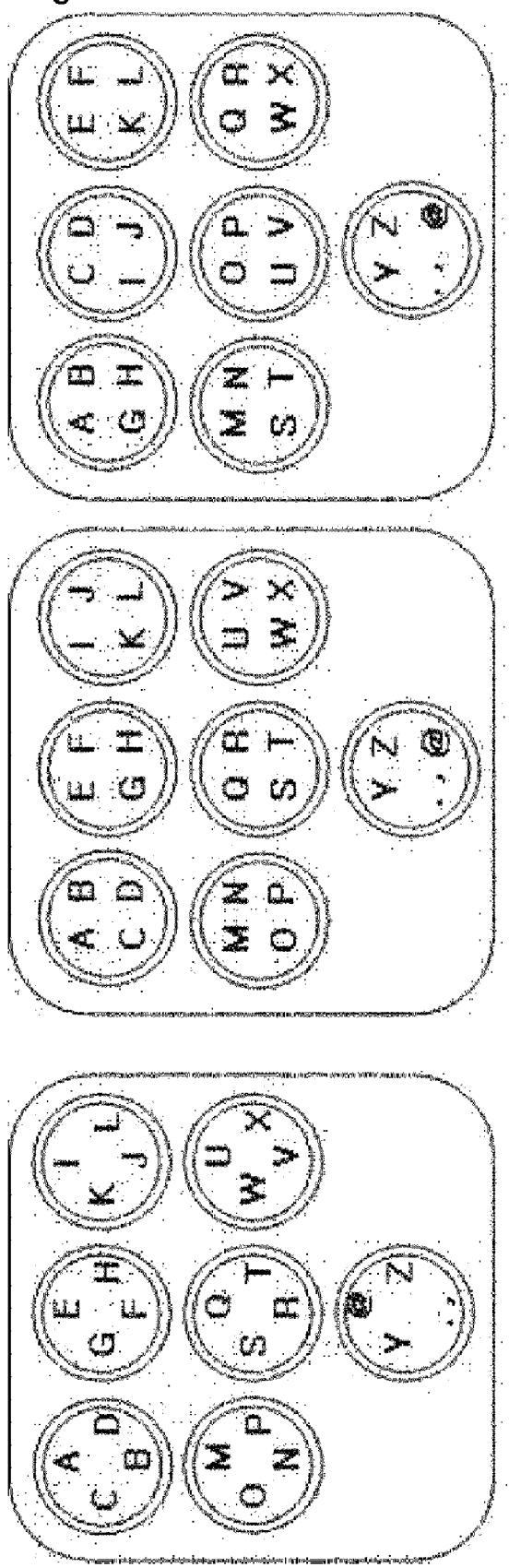

Referring to FIG. 20, user's confusion is reduced by arranging English characters in the input keys in a T format as illustrated in the FIG. 20 because arrangement method for characters is a horizontal writing which is similar to the arrangement method of a standard keypad of a traditional telephone.

Especially, in a T format, when input interfaces included in input keys are arranged diagonally, a T format arrangement and input interfaces are both horizontal writing so users' cognition ability could be enhanced. Furthermore, when these input keys are arranged in X shaped in the directions of diagonal of separated type, complete horizontal writing is possible. From this point of view, this method surely has advantages for English users. be arranged in X shaped in the directions of diagonal.

Figure 21:
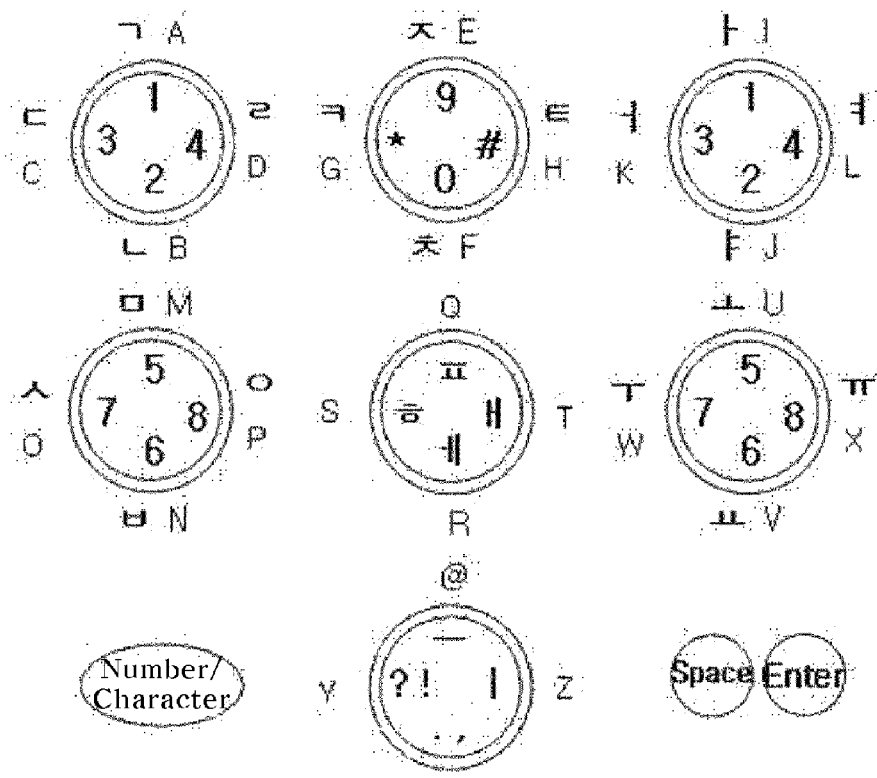

Referring to FIG. 21, there is illustrated that 7 input keys are arranged in a T format allotting Korean, English characters and numbers in each input key. As aforementioned, 3 input keys are arranged in the first and second rows in a keypad and additional input keys for the rest of characters are arranged in the third row. In result, a total of 28 characters can be allotted in only 7 input keys whereas a traditional telephone requires 12 input keys for allotting 28 characters.

Also, a 'Space' key at one side and an 'Enter' key at the right and left corner of input key in third row are added which are in order to make it possible to input characters with a thumb of one hand minimizing movement of fingers. Furthermore, convenience is enhanced by adding a input converting key at the other side of input key in third row for choosing whether to input characters or numbers.

Figure 22:
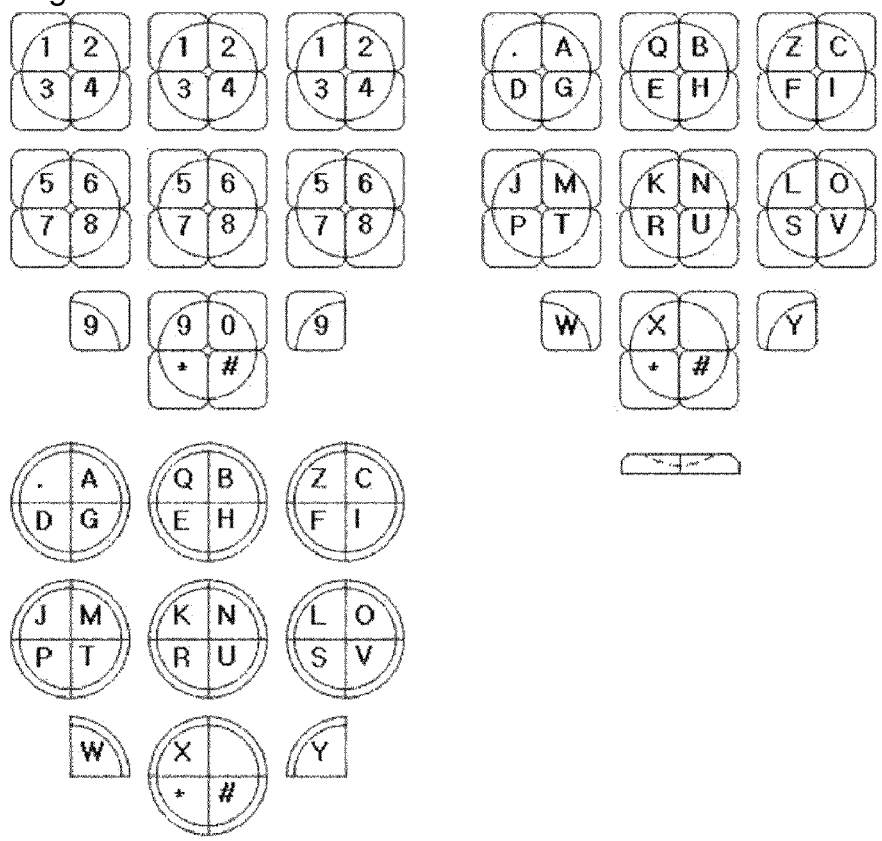
FIG. 22 is a drawing to explain a form and arrangement of input keys according to another exemplary embodiment of the present invention.

FIG. 22 is to explain a form and an arrangement of input keys according to another exemplary embodiment of the present invention.

Referring to FIG. 22, is an exemplary embodiment comparing two external forms of the input keys, a tetragonal form and a circular form. The external form of an input key could be modified into various forms such as a lozenge-shaped form and an oval-shaped form according to their design. The illustrated arrangement of English characters is allotting characters same as the way a telephone standard substrate allots English characters in each number. If the users' confusion in English using areas is concerned, by customizing the setting the users can use it according to user's convenience. The illustrated arrangement of English characters might suit to users in English using areas who are familiar with English characters and Japanese and Chinese who input pronunciation by English characters because they have already been using the method. Above all, realizing one typing per one character is the biggest advantage than any other confusion. Also, 'W' and 'Y' keys are used as a special character key or a function key as well when using Korean characters so that this arrangement brings a great merit to Korean characters users.

Figure 23:
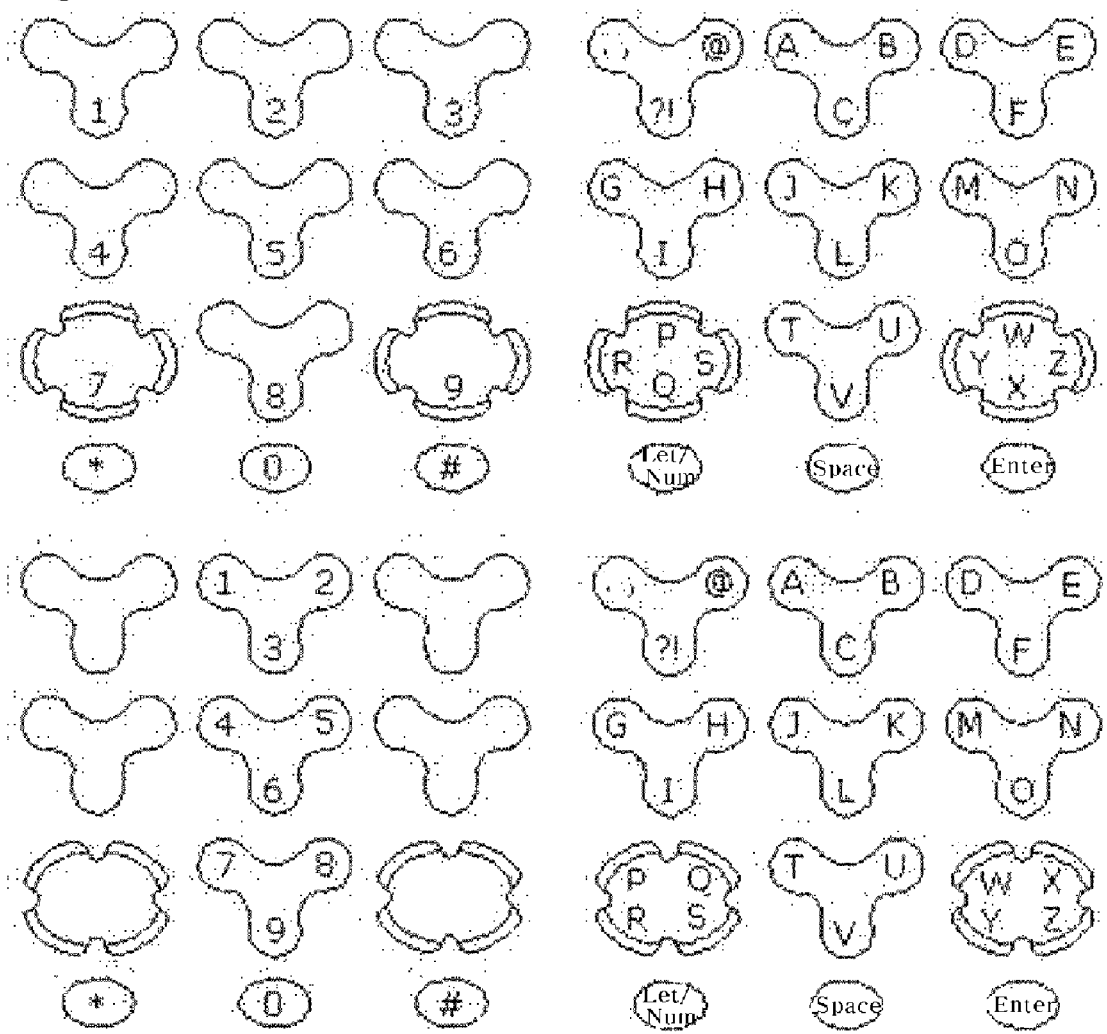
FIG. 23~FIG. 25 are examples of an apparatus for inputting a character applying the mix of input keys having 3 input interfaces and those having 4 input interfaces.
Figure 24:
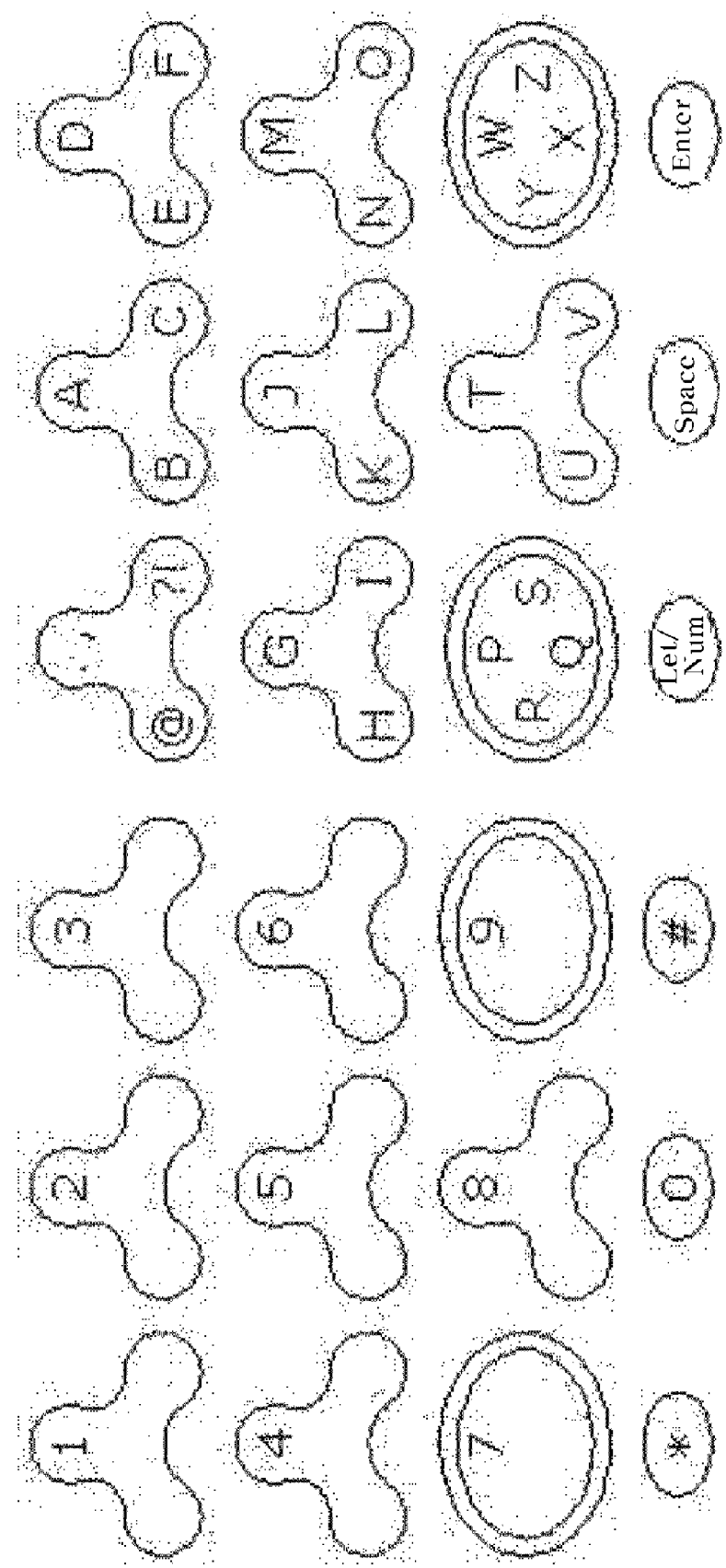
Figure 25:
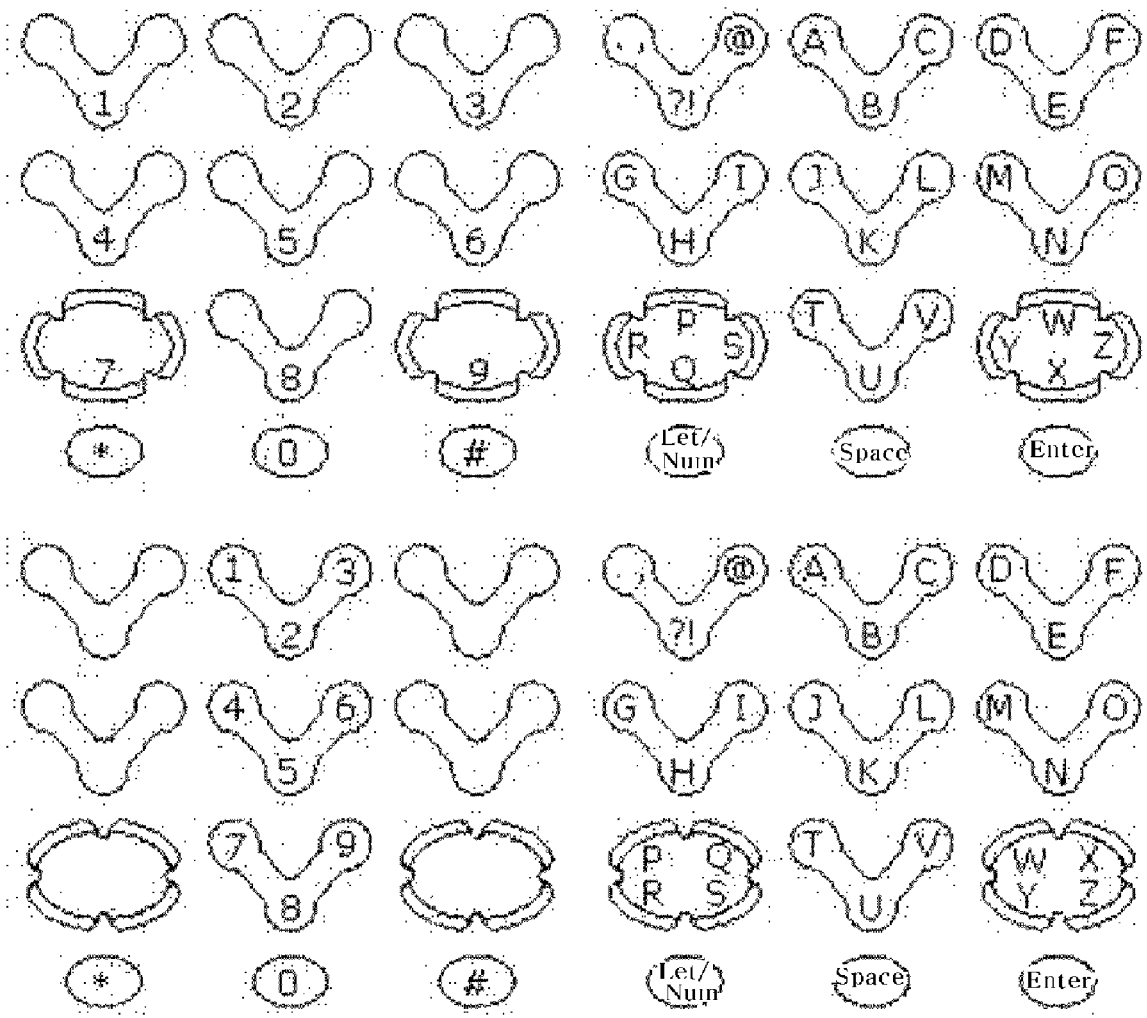

FIG. 23~FIG. 25 are examples of a character inputting apparatus applying the mix of input keys having 3 input interfaces and those having 4 input interfaces.

In the country, when allot English characters in a telephone standard number substrate, 'Q' and 'Z' are allotted in '1' key however, in foreign countries, 'Q' is allotted in '7'key so that a total of 4 characters, 'P', 'Q', 'R' and 'S' are allotted in '7'key and 'Z' is allotted in '9'key so that a total of 4 characters, 'W', 'X', 'Y' and 'Z' are allotted in '9'key.

Accordingly, in foreign countries, as a method to avoid a users' confusion, it is efficient to change the position of '7' and '9' keys in telephone standard number substrate into input keys having 4 input interfaces in a keypad that input keys having 3 input interfaces which is similar to a traditional telephone standard number substrate are arranged.

Also, this arrangement method has an advantage that in a game like mobile game, input keys are used as a direction key or a forward key by putting the thumbs of both hands on a input key having 4 input interfaces in the right and left.

While an apparatus for inputting a character according to this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. An apparatus for inputting a character having several input keys in a keypad to input characters, wherein the input keys have 3 input interfaces outputting different key signal and each character is allotted in each input interface so that 3 different characters can be input with one input key, and wherein the input keys having 3 input interfaces are placed 3 by 3, a total of nine, in the above keypad.

2. The apparatus for inputting a character according to claim 1, wherein the above input keys are Y shaped or V shaped.

3. The apparatus for inputting a character according to claim 1, wherein the input keys are V-shaped and wherein the input keys placed 3 by 3 are aligned along first, second and third vertical lines and aligned along first, second and third horizontal lines, the V-shaped keys aligned along the first and third vertical lines being oriented opposite to the orientation of V-shaped keys aligned along the second vertical line.

4. The apparatus for inputting a character according to claim 1, wherein the input keys arranged in zigzags lowering or raising the even lines than the odd lines at regular intervals.

5. An apparatus for inputting a character having several input keys in a keypad to input characters, wherein the input keys have 4 input interfaces outputting different key signal and each character is allotted in each input interface so that 4 different characters can be input with one input key, wherein 4 input interfaces of the input key are one integrated type or separated type, and wherein the 7 input keys in the above key pad are arranged in a H format or a T format.

6. The apparatus for inputting a character according to claim 5, wherein when the above input keys are arranged in the H format or the T format, the intervals between the input keys in the lower row and in the top row are closer or wider than the intervals between the input keys in the middle row.

7. The apparatus for inputting a character according to claim 5, wherein when the above input keys are arranged in a H format, one input key in the middle is arranged higher than the side input keys.

8. The apparatus for inputting a character according to claim 5, wherein when the above input keys are arranged in a T format, 3 input keys are arranged in the first line and second line each and a one input key is arranged in the middle of the third line.

9. The apparatus for inputting a character according to claim 5, wherein when the above input keys are arranged in a T format, the middle line is lowered or raised.

10. The apparatus for inputting a character according to claim 5, wherein when input keys arranged in a H format are applied in an apparatus for inputting a character of a small sized electronic equipment, the input keys in a H format are arranged 3 for the right and left side each and 1 in the middle for the right and left side of the middle so a total of 7 input keys are arranged.

11. The apparatus for inputting a character according to claim 5, wherein when the input keys arranged in the H format are applied in a apparatus for inputting a character of a small sized electronic equipment, the input keys in the H format are arranged 3 for the right and left side each so a total of 6 input keys are arranged or the input keys in the H format are arranged 3 for the right and left side each and 1 for right center region and 1 for left center region so a total of 8 input keys are arranged.

12. An apparatus for inputting a character having several input keys in a keypad to input characters, wherein the input keys have 3 or 4 input interfaces outputting different key signal and certain characters are allotted in each input interface so that 3 or 4 different characters can be input with one input key and, wherein the above input keys are arranged 3 by 3, a total of 9, in the above keypad, and wherein the input keys having 4 input interfaces are positioned in '7' and '9' keys in telephone standard number substrate and the rest of keys are consist of the input keys having 3 input interfaces.

* * * * *